US012091474B2

(12) United States Patent
Kuhel, III et al.

(10) Patent No.: US 12,091,474 B2
(45) Date of Patent: Sep. 17, 2024

(54) METHOD FOR PRODUCING POLYDIENES WITH REDUCED COLD FLOW

(71) Applicant: Bridgestone Americas Tire Operations, LLC, Nashville, TN (US)

(72) Inventors: James J. Kuhel, III, Stow, OH (US); David M. Roggeman, North Royalton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 642 days.

(21) Appl. No.: 17/426,941

(22) PCT Filed: Jan. 28, 2020

(86) PCT No.: PCT/US2020/015425
§ 371 (c)(1),
(2) Date: Jul. 29, 2021

(87) PCT Pub. No.: WO2020/160000
PCT Pub. Date: Aug. 6, 2020

(65) Prior Publication Data
US 2022/0106421 A1    Apr. 7, 2022

Related U.S. Application Data

(60) Provisional application No. 62/798,186, filed on Jan. 29, 2019.

(51) Int. Cl.
| | | |
|---|---|---|
| C08F 136/06 | (2006.01) | |
| C08F 2/00 | (2006.01) | |
| C08F 2/06 | (2006.01) | |
| C08F 2/44 | (2006.01) | |
| C08F 4/54 | (2006.01) | |
| C08F 136/00 | (2006.01) | |
| C08K 5/12 | (2006.01) | |
| B60C 1/00 | (2006.01) | |

(52) U.S. Cl.
CPC ............ *C08F 136/06* (2013.01); *C08F 2/001* (2013.01); *C08F 2/06* (2013.01); *C08F 2/44* (2013.01); *C08F 4/545* (2013.01); *C08F 136/00* (2013.01); *C08K 5/12* (2013.01); *B60C 1/0016* (2013.01); *B60C 1/0025* (2013.01)

(58) Field of Classification Search
USPC ..................................................... 525/333.2
See application file for complete search history.

(56) References Cited

U.S. PATENT DOCUMENTS

| | | |
|---|---|---|
| 6,391,990 B1 | 5/2002 | Ishino |
| 2004/0147694 A1 | 7/2004 | Sone |
| 2005/0038215 A1 | 2/2005 | Luo et al. |
| 2008/0182954 A1 | 7/2008 | Luo et al. |
| 2009/0292043 A1 | 11/2009 | Kurazumi et al. |
| 2010/0105813 A1 | 4/2010 | Wissel et al. |
| 2010/0317794 A1 | 12/2010 | Tanaka |
| 2011/0152449 A1 | 6/2011 | Luo |
| 2013/0085227 A1 | 4/2013 | Luo et al. |

FOREIGN PATENT DOCUMENTS

| | | | |
|---|---|---|---|
| CN | 101600736 A | 12/2009 | |
| EP | 0867468 A1 | 9/1998 | |
| EP | 1026181 A1 | 8/2000 | |
| EP | 1435375 A1 | 7/2004 | |
| EP | 2098541 A1 | 9/2009 | |
| EP | 2098541 B1 * | 6/2013 | ........... B60C 1/0016 |
| JP | 05051406 A | 3/1993 | |
| JP | H0551406 A | 3/1993 | |
| JP | H05279515 A | 10/1993 | |
| JP | H10306113 A | 11/1998 | |
| JP | 2000226408 A | 8/2000 | |
| JP | 2001098013 A | 4/2001 | |
| JP | 2001098015 A | 4/2001 | |
| KR | 20090091807 A | 8/2009 | |
| WO | 2008078814 A1 | 7/2008 | |

OTHER PUBLICATIONS

Liu Dahua; A Comprehensive Handbook of Synthetic Rubber Technology; Lanzhou Chemical Industry Company, Chemical Industry Press, 1991, ISBN: 7-5025-0944-6/TQ.
International Search Report and Written Opinion issued in corresponding International PCT Application No. PCT/US2020/015425; Mailing Date: Jan. 28, 2020.
Extended European Search Report issued in corresponding European Patent Application No. 20749550.8; Mailing Date: Sep. 30, 2022.

* cited by examiner

*Primary Examiner* — Terressa Boykin
(74) *Attorney, Agent, or Firm* — Meredith E. Hooker; J. Gregory Chrisman

(57) ABSTRACT

A process for preparing a polydiene having increased viscosity and reduced cold flow that includes polymerizing a conjugated diene monomer in the presence of a lanthanide-containing compound to form an intermediate polymer, and then adding a non-organometallic trimellitate ester compound as a coupling agent to raise the viscosity of the intermediate polymer. The coupling agent is added to the intermediate polymer mixture in an amount of about 0.01 to about 0.15 parts per hundred monomer (phm) of the starting monomer amount.

20 Claims, 2 Drawing Sheets

METHOD FOR PRODUCING POLYDIENES WITH REDUCED COLD FLOW

TECHNICAL FIELD

The present disclosure relates to processes for preparing polydienes and, in particular, to preparing polydienes with the use of a non-organometallic aromatic trimester or trimellitate ester compound as a coupling agent to increase the viscosity of the polymer.

BACKGROUND

Polydienes are known to be produced by solution polymerization in that conjugated diene monomer is polymerized in an inert solvent or diluent. The polydienes, for example cis-1,4-polydienes, are often employed in the manufacture of tire components, such as sidewalls and treads. These polydiene polymers are frequently produced by using lanthanide-based catalyst systems, which results in the formation of polymers characterized by a linear backbone.

While polydiene, such as those having a linear backbone, demonstrate a number of advantageous properties, especially for use in tires, these polymers exhibit cold flow due to their linear backbone structures. Conventionally, especially with anionically-polymerized polymers, the cold flow issues can be alleviated through polymer coupling. Polymer coupling can also present some difficulties. The benefits associated with a reduction in cold flow must be balanced with the processability of the polymers during compounding. For example, during solution polymerization, the solvent serves as a carrier for the reactants and allows easier stirring and transferring of the polymerization mixture (also called cement), since the viscosity of the cement, is decreased by the presence of the solvent. Thus, coupling in a polymerization reaction can unpredictably increase viscosity and needs to be controlled to retain the processability of the polymer during compounding.

Also, the ability to react certain compounds or reagents with a polymer chain, especially the reactive end of a polymer chain, can be unpredictable. Still further, it can be difficult to predict whether any particular coupling agent may have a deleterious impact upon one or more of the properties sought from the polymer and/or its use within particular compositions, such as those employed in the manufacture of tire components.

Because there is a need to reduce the cold flow of synthetic elastomers, especially linear polymers prepared by lanthanide-based catalyst systems and anionic initiators, without having a deleterious impact on the processability and/or use of the polymers, especially in the manufacture of tire components, there exists a need to develop new coupling agents and methods for coupling, polymers.

SUMMARY

In a first aspect, disclosed is a process for preparing a polydiene, the process includes the steps of (a) polymerizing conjugated diene monomer to a monomer conversion rate of 60 percent or more within a liquid-phase polymerization mixture to form an intermediate polymer, the liquid-phase polymerization mixture contains at least conjugated diene monomer, a lanthanide-containing compound and an alkylating agent, wherein the intermediate polymer has a base Mooney viscosity. The process further includes step (b) of adding a non-organometallic trimellitate ester compound or non-organometallic aromatic triester compound as a coupling agent in an amount of about 0.02 to about 0.12 phm to the intermediate polymer, wherein the addition of the non-organometallic trimellitate ester compound or non-organometallic aromatic triester compound increases the base Mooney viscosity of the intermediate polymer in the range of about 30 to about 80 percent.

In an example of aspect 1, the Mooney viscosity ($ML_{1+4}$) of the intermediate polymer is in the range of about 20 to about 30 and the Mooney viscosity ($ML_{1+4}$) of the polymer after addition of the coupling agent is in the range of about 35 to about 45.

In an example of aspect 1, the polydiene is prepared as polybutadiene. The polybutadiene comprises substantially polybutadiene. In another example, the polybutadiene is not a copolymer and consists of substantially polybutadiene.

In another example of aspect 1, the intermediate polymer of step (a) includes a base cold flow value and the addition of the non-organometallic trimellitate ester compound or non-organometallic aromatic triester compound increases the base cold flow value of the intermediate polymer in the range of about 20 to about 50 percent.

In another example of aspect 1, the intermediate polymer of step (a) includes a conjugated diene monomer conversion of 80% or more or 90% or more.

In another example of aspect 1, the polythene prepared by the process has a weight average molecular weight between about 100,000 and about 350,000.

In another example of aspect 1, the lanthanide-containing compound is a neodymium compound.

In another example of aspect 1, the non-organometallic trimellitate ester compound is tri-2-ethylhexyl trimellitate or triisononyl trimellitate.

In another example of aspect 1, the non-organometallic aromatic triester compound is a compound of formula (1)

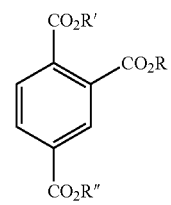

wherein R, R' and R" are independently selected from hydrocarbyl groups containing 1 to 20 carbons.

In another example of aspect 1, the non-organometallic aromatic triester compound of formula (1) is selected from the group consisting of trimethyl 1,2,4-benzenetricarboxylate, triethyl 1,2,4-benzenetricarboxylate, tripropyl 1,2,4-benzenetricarboxylate, tributyl 1,2,4-benzenetricarboxylate, tripentyl 1,2,4-benzenetricarboxylate, trihexyl 1,2,4-benzenetricarboxylate, triheptyl 1,2,4-benzenetricarboxylate, tricyclohexyl 1,2,4-benzenetricarboxylate, trioctyl 1,2,4-benzenetricarboxylate, tri(2-ethylhexyl) 1,2,4-benzene tricarboxylate, trinonyl 1,2,4-benzenetricarboxylate, tridecyl 1,2,4-benzenetricarboxylate, tridodecyl 1,2,4-benzenetricarboxylate, butyldimethyl 1,2,4-benzenetricarboxylate, butyldiethyl 1,2,4-benzenetricarboxylate, tri-2-ethylhexyl trimellitate and triisononyl trimellitate.

In another example of aspect 1, the non-organometallic aromatic triester compound, is a compound of formula (2)

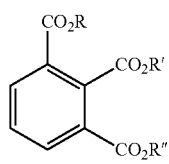

wherein R, R' and R" are independently selected from hydrocarbyl groups containing 1 to 20 carbons.

In another example of aspect 1, the non-organometallic aromatic triester compound of formula (2) is selected from the group consisting of trimethyl 1,2,3-benzenetricarboxylate, triethyl 1,2,3-benzenetricarboxylate, tripropyl 1,2,3-benzenetricarboxylate, tributyl 1,2,3-benzenetricarboxylate, tripentyl 1,2,3-benzenetricarboxylate, trihexyl 1,2,3-benzenetricarboxylate, triheptyl 1,2,3-benzenetricarboxylate, tricyclohexyl 1,2,3-benzenetricarboxylate, trioctyl 1,2,3-benzenetricarboxylate, tri(2-ethylhexyl) 1,2,3-benzene tricarboxylate, trinonyl 1,2,3-benzenetricarboxylate, tridecyl 1,2,3-benzenetricarboxylate, tridodecyl 1,2,3 -benzenetricarboxylate, butyldimethyl 1,2,3-benzenetricarboxylate, butyldiethyl 1,2,3-benzenetricarboxylate, tri-2-ethylhexyl hemimellitate and triisononyl hemimellitate.

In another example of aspect 1, the non-organometallic aromatic triester compound is a compound of formula (3)

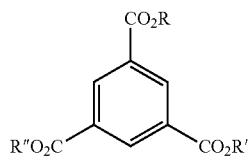

wherein R, R' and R" are independently selected from hydrocarbyl groups containing 1 to 20 carbons.

In another example of aspect 1, the non-organometallic aromatic triester compound of formula (3) is selected from the group consisting of trimethyl 1,3,5-benzenetricarboxylate, triethyl 1,3,5-benzenetricarboxylate, tripropyl 1,3,5-benzenetricarboxylate, tributyl 1,3,5-benzenetricarboxylate, tripentyl 1,3,5-benzenetricarboxylate, trihexyl 1,3,5-benzenetricarboxylate, triheptyl 1,3,5-benzenetricarboxylate, tricyclohexyl 1,3,5-benzenetricarboxylate, trioctyl 1,3,5-benzenetricarboxylate, tri(2-ethylhexyl) 1,3,5-benzene tricarboxylate, trinonyl 1,3,5-benzenetricarboxylate, tridecyl 1,3,5-benzenetricarboxylate, tridodecyl 1,3,5-benzenetricarboxylate, butyldimethyl 1,3,5-benzenetricarboxylate, butyldiethyl 1,3,5-benzenetricarboxylate, tri-2-ethylhexyl trimesitate and triisononyl trimesitate.

In another example of aspect 1, the non-organometallic trimellitate ester compound is added in an amount of about 0.035 to about 0.085 phm to the intermediate polymer.

In another example of aspect 1, the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3 -pentadiene, 3-methyl-1,3-pentadiene, 4-methyl-1,3-pentadiene, 2,4-hexadiene, and mixtures of two or more thereof.

In another example of aspect 1, the conjugated diene monomer includes or is 1,3-butadiene.

In another example of aspect 1, the polydiene has a cis-1,4-linkage content of 95 percent or more.

In another example of aspect 1, the liquid-phase polymerization mixture of step (a) further includes an organic solvent.

In another example of aspect 1, the liquid-phase polymerization mixture is maintained at a temperature from about 80° C. to about 120° C. during step (a).

In another example of aspect 1, the amount of the lanthanide-containing compound is present in the liquid-phase polymerization mixture of step (a) in an amount from about 0.001 to about 2 mmol per 100 g of conjugated diene monomer, In another example of aspect 1, the liquid-phase polymerization mixture of step (a) further includes a halogen-containing compound, for example, an organometallic chloride compound.

In another example of aspect 1, there is a polydiene polymer prepared the process of aspect 1, wherein the polydiene polymer has a Mooney viscosity in the range about 35 to about 45 ($ML_{1+4}$).

In a second aspect, there is a process for preparing a polybutadiene, the process includes the steps of: (a) polymerizing butadiene monomer in a reaction vessel in the presence of a lanthanide-containing compound and an alkylating agent to a conversion of 80 percent or more to form an intermediate polymer; (b) transferring the intermediate polymer to a second reaction vessel; and (c) adding a non-organometallic trimellitate ester compound or non-organometallic aromatic triester compound as a coupling agent in an amount of about 0.02 to about 0.12 phm to the polymer cement in the second reaction vessel to form a polybutadiene cement.

In an example of aspect 2, the polybutadiene cement has a Mooney viscosity in the range about 35 to about 45 ($ML_{1+4}$).

In another example of aspect 2, the non-organometallic trimellitate ester compound is tri-2-ethylhexyl trimellitate or triisononyl trimellitate.

In another example of aspect 2, the non-organometallic aromatic triester compound, is a compound of formula (1), (2) or (3) herein.

In another example of aspect 2, the intermediate polymer transferred to the second reaction vessel has a Mooney viscosity in the range about 20 to about 30 ($ML_{1+4}$).

In another example of aspect 2, the polybutadiene has a cis-1,4-linkage content of 95 percent or more. For example, the high-cis polybutadiene is the polymer extracted from the second reaction vessel after the coupling reaction occurs.

In another example of aspect 2, the conversion of butadiene monomer in the polybutadiene cement in the second reaction vessel is 95 percent or more.

In another example of aspect 2, there is a polybutadiene polymer prepared the process of aspect 2, wherein the polydiene polymer has a Mooney viscosity in the range about 35 to about 45 ($ML_{1+4}$) and a cis-1,4-linkage content of 95 percent or more.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

Additional features and advantages will be set forth in the detailed description which follows, and in part will be readily apparent, to those skilled in the art from that description or recognized by practicing the embodiments as described herein, including the detailed description which follows, the claims. It is to be understood that both the foregoing general description and the following detailed description are merely exemplary, and are intended to provide an overview or framework to understanding the nature and character of the claims.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

Figure 1:
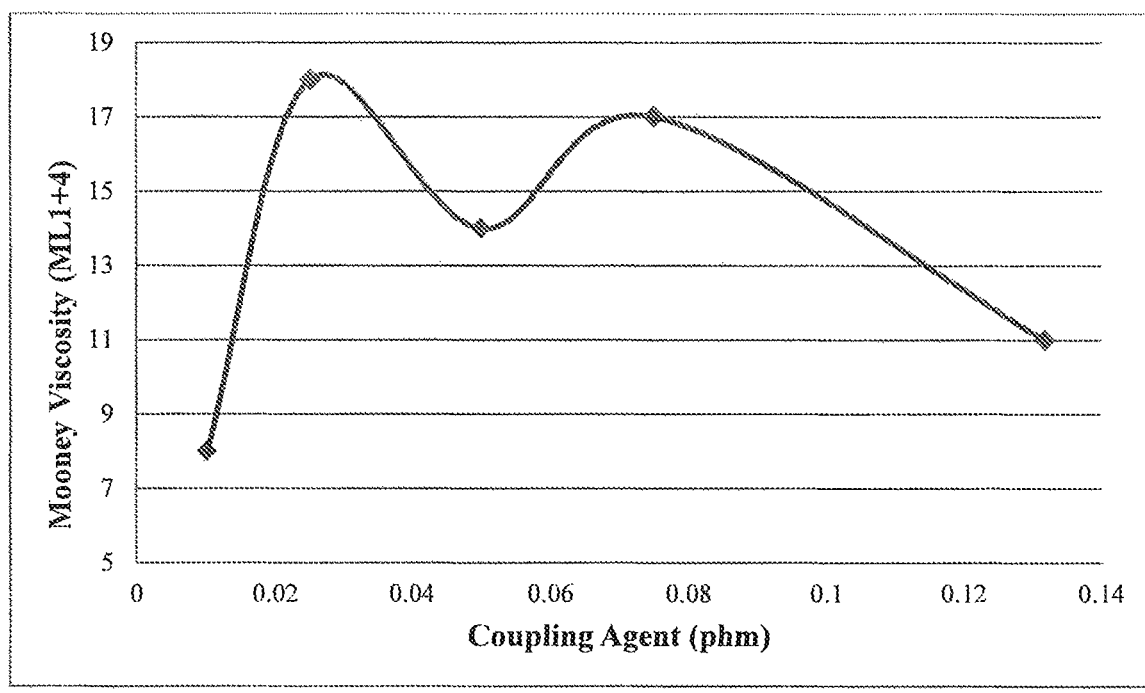
FIG. 1 is a graphical plot of Mooney viscosity ($ML_{1+4}$ at 100° C.) versus amount of coupling agent used for high-cis polybutadiene prepared according to one or more embodiments of the present invention.

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more or less than 25. In an example, such a range defines independently 5 or more, and separately and independently, 25 or less.

The present disclosure relates to polydienes that are produced by polymerizing conjugated diene monomer with one or more catalysts to form -a reactive or intermediate polymer, which is then reacted with a coupling agent. In one or more embodiments, the coupling agent is a non-organometallic aromatic triester compound. In one or more embodiments, the coupling agent is a non-organometallic trimellitate ester compound. The coupling agent in some embodiments is added to the polymerization mixture after conversion of monomer to a level of about 80 percent to selectively increase the viscosity of the polymer and reduce cold flow. The polydienes produced by one or more embodiments of the invention are advantageously characterized by a high cis-1,4-linkage content and optionally a narrow molecular weight distribution. The resultant coupled polymers can be used in the manufacture of tire components.

In one or more embodiments, the reactive or intermediate polymer is prepared by coordination polymerization, wherein conjugated diene monomer is polymerized by using a coordination catalyst system. The key mechanistic features of coordination polymerization have been discussed in books (e.g., Kuran, W., Principles of Coordination Polymerization; John Wiley & Sons: New York, 2001) and review articles (e.g., Mulhaupt, R., Macromolecular Chemistry and Physics 2003, volume 204, pages 289-327). Coordination catalysts initiate the polymerization of monomer by a mechanism that involves the coordination or complexation of monomer to an active metal center prior to the insertion of monomer into a growing polymer chain. As is known in the art, there are numerous methods for creating coordination catalysts, but all methods eventually generate an active intermediate that is capable of coordinating with monomer and inserting monomer into a covalent bond between an active metal center and a growing polymer chain. Coordination catalysts can be one-, two-, three- or multi-component systems. In one or more embodiments, a coordination catalyst may be formed by combining a heavy metal compound (e.g., a transition metal compound or a lanthanide-containing compound), an alkylating agent (e.g., an organoaluminum compound), and optionally other co-catalyst components (e.g., a Lewis acid or a Lewis base).

In accordance with one embodiment of the present invention, catalyst systems are provided comprising at least one lanthanide-containing compound, at least one alkylating agent, and at least one halogen source. The catalyst systems of the present invention can, be employed in polymerizing one or more types of conjugated diene monomers to thereby form a polydiene.

In one or more embodiments, examples of conjugated diene monomer that can be polymerized can include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4- methyl-1,3-pentadiene, and 2,4-hexadiene. Mixtures of two or more conjugated dienes may also be utilized in copolymerization.

As mentioned above, the catalyst systems of the present invention can comprise at least one lanthanide-containing compound. Lanthanide-containing compounds useful in the present invention are those compounds that, include at least one atom of lanthanum, neodymium, cerium, praseodymium promethium, samarium, europium, gadolinium, terbium, dysprosium, holmium, erbium, thulium, ytterbium, lutetium and didymium. In one embodiment, these compounds can include neodymium, lanthanum, samarium, or didymium. As used herein, the term "didymium" shall denote a commercial mixture of rare-earth elements obtained from monazite sand. In addition, the lanthanide-.containing compounds useful in the present invention can be in the form of elemental lanthanide, The lanthanide atom in the lanthanide-containing compounds can be in various oxidation states including, but not limited to, the 0, +2, +3. and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide .beta.-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art, will he able to select similar compounds that are based upon other lanthanide metals.

As mentioned above, lanthanide-containing compounds employed in the present invention can comprise lanthanide carboxylates, such as, for example, a neodymium carboxylate. Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

Lanthanide-containing compounds, as noted above, can also be lanthanide organophosphates, such as, for example, a neodymium organophosphates, lanthanide organophosphinates, such as, for example, a neodymium organophosphinate, lanthanide carbamates, such as, for example, a neodymium carbamate, lanthanide xanthates, such as, for example, a neodymium xanthate, lanthanide β-diketonates, such as, for example, a neodymium β-diketonate, lanthanide alkoxides or aryloxides, such as, for example, a neodymium alkoxide or a neodymium aryloxide, or lanthanide halides, pseudo-halides or oxyhalides, such as, for example, a neodymium halide, a neodymium pseudo-halide, or a neodymium oxyhalide.

In one or more embodiments, a solvent may be employed as a carrier to either dissolve or suspend the catalyst or catalyst ingredients of the system in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during, the polymerization of monomer in the presence of catalyst. In one or more embodiments, these organic solvents are inert to the catalyst. In one or more embodiments, these organic solvent are liquid at ambient temperature and pressure. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. Non-limiting examples of cycloaliphatic hydrocarbons include cyclopentane, cyclohexane, methylcyclopentane, and methylcyclohexane. Mixtures of the above hydrocarbons may also be used. Aliphatic and cycloaliphatic hydrocarbons may be desirably employed for environmental reasons. The low-boiling hydrocarbon solvents are typically separated from the polymer upon completion of the polymerization.

As mentioned above, the catalyst systems of the present invention can include one or more alkylating agents. Various alkylating agents, or mixtures thereof, can be used. In one or more embodiments, alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes a labile chlorine atom, the alkylating agent may also serve as the chlorine-containing compound. The term "organoaluminum compound" may refer to any aluminum compound containing at least one aluminum-carbon bond. In one or more embodiments, organoaluminum compounds may be soluble in a hydrocarbon solvent.

Examples of trihydrocarbylaluminum, compounds include trimethylaluminum, triethylaluminum, triisobutylaluminum, tri-n-propylaluminum, triisopropylaluminum, tri-n-butylaluminum, tri-t-butylaluminum, tri-n-pcntylaluminum, trineopentylaluminum, tri-n-hexylaluminum, tri-n-octylalunainum, tris(2-ethylhexyl)aluminum, tricyclohexylaluminum, tris(1-methylcyclopentyl)aluminum, triphenylaluntinwn, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Examples of dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-oetylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

In other embodiments, it has been found to be advantageous to add a Lewis acid to the solutions of the lanthanide compounds to reduce the viscosities of these solutions before employing them in polymerization, These modified solutions of the lanthanide compounds are easy to transfer and easy to mix with other catalyst components or the monomer without the need to employ a long mixing time, In addition, the use of these modified solutions of the lanthanide compounds lead to consistent polymerization results and reduced reactor fouling, Suitable Lewis acids may include transition metal halides, halides of the elements of Groups 2, 12, 13, 14, and 15 of the IUPAC Periodic Table, and organometallic halides in which the metal atom belongs to the elements of Groups 2, 12, 13, or 14 of the IUPAC Periodic Table. Specific examples of suitable Lewis acids include methylaluminum dichloride, methylaluminum dibromide, ethylaluminurn dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tnchloride, aluminum tribromide, antimony trichloride, antimony pentachloride, phosphorus trichloride, phosphorus pentachloride, boron trifluoride, boron trichloride, boron tribromide, gallium trichloride, indium trichloride, zinc dichloride, magnesium dichloride, magnesium dibromide, titanium tetrachloride, and tin tetrachloride.

Various chlorine-containing compounds or a halogen source, or mixtures thereof, that contain one or more labile chlorine atoms can be employed as a Lewis acid or in conjunction therewith. A combination of two or more chlorine-containing compounds can also be utilized. In one or more embodiments, the chlorine-containing compounds may be soluble in a hydrocarbon solvent. In other embodiments, hydrocarbon-insoluble chlorine-containing compounds, which can be suspended in the polymerization medium to form the catalytically active species, may be useful.

Suitable types of chlorine-containing compounds include, but are not limited to, elemental chlorine, hydrogen chlorides, organic chlorides, inorganic chlorides, metallic chlorides, organometallic chlorides, and mixtures thereof. Examples of organic chlorides include t-butyl chloride, allyl chloride, benzyl chloride, diphenylmethyl chloride, triphenylmethyl chloride, benzylidene chloride, methyltrichlorosilane, phenyltrichlorosilane, dimethyldichlorosilane, diphenyldichlorosilane, trimethylchlorosilane, benzoyl chloride, propionyl chloride, and methyl chloroformate.

Examples of inorganic chlorides include phosphorus trichloride, phosphorus pentachloride, phosphorus oxychloride boron trichloricle, silicon tetrachloride, arsenic trichloride selenium tetrachloride, and tellurium tetrachloride. Examples of metallic chlorides include tin tetrachloride, aluminum trichloride, antimony trichloride, antimony pentachloride, gallium trichloride, indium trichloride, titanium tetrachloride, and zinc dichloride. Examples of organometallic chlorides include organoaluminum chlorides such as dimethylaluminum chloride, diethylaluminum chloride, methylaluminum dichloride, ethylaluminum dichloride, methylaluminum sesquiehloride, ethylaluminum sesquichloride, and isobutylaluminum sesquichloride; organomagnesium chlorides such as methylmagnesium chloride, ethylmagnesium chloride, n-butylmagnesium chloride, phenylmagnesium chloride, and benzylmagnesium chloride; and organotin chlorides such as trimethyltin chloride, triethyltin chloride, di-n-butyltin dichloride, di-t-butyltin dichloride, and tri-n-butyltin chloride.

The production of polydienes according to this, invention can be accomplished by polymerizing conjugated diene monomer in the presence of a catalytically effective amount of the foregoing catalyst composition or system. The introduction of the catalyst composition, the conjugated diene monomer, and any solvent if employed forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly. a specific total catalyst concentration cannot be definitively set forth except to say that catalytically effective amounts of the respective catalyst ingredients can be used.

In one or more embodiments, the amount of the lanthanide-containing compound used can be varied from about 0.001 to about 10 mmol, in other embodiments from about 0.002 to about 1 mmol, in other embodiments from about 0.005 to about 0.5 mmol, and in other embodiments from about 0.01 to about 0.2 mmol per 100 g of conjugated diene monomer.

In one or more embodiments, the amount of the lanthanide-containing, compound used, expressed in parts per hundred parts by weight of the conjugated diene monomers (phm), can be from about 0.005 to about 5 phm, preferably from about 0.075 to about 2 phm, and more preferably from about 0.1 to about 1 phm.

in one or more embodiments, the molar ratio of the alkylating agent to the lanthanide-containing compound can be varied from about 1:1 to about 1,000:1, in other embodiments from about 2:1 to about 500:1, and in other embodiments from about 5:1 to about 100:1.

The molar ratio of the Lewis acid or halogen-containing compound to the lanthanide-containing compound is best described in terms of the ratio of the moles of halogen atoms in the halogen source to the moles of lanthanide atoms in the lanthanide-containing compound. In one or more embodiments, the molar ratio can be varied from about 0,5:1 to about 20:1, in other embodiments from about 1:1 to about 10:1, and in other embodiments from about 2:1 to about 6:1.

In one embodiment, the lanthanide-based catalyst composition may be formed in situ by adding the catalyst ingredients to a solution containing monomer and solvent, or to bulk monomer, in either a stepwise or simultaneous manner. In one embodiment, the alkylating agent can be added first, followed by the lanthanide-containing compound, and then followed by the halogen source.

In another embodiment, the lanthanide-based catalyst composition may be performed. That is, the catalyst ingredients are pre-mixed outside the polymerization system either in the absence of any monomer or in the presence of a small amount of at least one conjugated diene monomer at an appropriate temperature, which may be from about −20° C. to about 80° C. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide-containing compound. The resulting, catalyst composition may be aged, if desired, prior to being added to the monomer that is to be polymerized.

The production of the reactive or intermediate polymer according to this invention can be accomplished by polymerizing conjugated diene monomer in the presence of a catalytically effective amount of the catalyst system. The introduction of the catalyst, the conjugated diene monomer and any solvent, if employed, forms a polymerization mixture in which the intermediate reactive polymer is formed. The amount of the catalyst to be employed may depend on the interplay of various factors such as the type of catalyst employed, the purity of the ingredients, the polymerization temperature, the polymerization rate and conversion desired, the molecular weight desired, and many other factors. Accordingly, a specific catalyst amount cannot be definitively set forth except to say that catalytically effective amounts of the catalyst or initiator may be used.

In one or more embodiments, the polymerization may be carried out in a polymerization system that includes a substantial amount of solvent. In one embodiment a solution polymerization system may be employed in which both the monomer to be polymerized and the polymer formed are soluble in the solvent. In another embodiment, a precipitation polymerization system may be employed by choosing a solvent in which the polymer formed is insoluble, In both eases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional, polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

The polydienes produced by the polymerization process of this invention may possess pseudo-living characteristics, such that some of polymer chains in these polymers have reactive chain ends. Once a desired monomer conversion is achieved, a coupling agent may optionally be introduced into the polymerization mixture to react with any reactive polymer chains so as to give a polymer cement of a coupled polymer. In one or more embodiments, the coupling agent is introduced prior to contacting the polymerization mixture with a quenching agent. In other embodiments, the coupling may be introduced after the polymerization mixture has been partially quenched with a quenching agent.

The coupling agent can include non-organometallic aromatic triester compound, for example, a non-organometallic trimellitate ester compound. A non-organometallic trimellitate ester compound can include tri-2-ethylhexyl trimellitate or triisononyl trimellitate. In one or more embodiments, the non-organometallic aromatic triester compound can include a compound of formula (1):

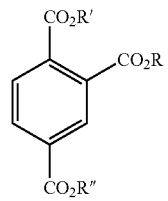

wherein R, R' and R" are independently selected from hydrocarbyl groups containing 1 to 20 carbons. Examples of compounds of formula (1) include trimethyl 1,2,4-benzenetricarboxylate, triethyl 1,2,4-benzenetricarboxylate, tripropyl 1,2,4-benzenetricarboxylate, tributyl 1,2,4-benzenetricarboxylate, tripentyl 1,2,4-benzenetricarboxylate, trihexyl 1,2,4-benzenetricarboxylate, triheptyl 1,2,4-benzenetricarboxylate, tricyclohexyl 1,2,4-benzenetricarboxylate, trioctyl 1,2,4-benzenetricarboxylate, tri(2-ethylhexyl) 1,2,4-benzene tricarboxylate, trinonyl 1,2,4-benzenetricarboxylate, tridecyl 1,2,4-benzenetricarboxylate, tridodecyl 1,2,4-benzenetricarboxylate, butyldimethyl 1,2,4-benzenetricarboxylate, and butyldiethyl 1,2,4-benzenetricarboxylate. Other examples of non-organometallic trimellitate ester coupling agents are tri-2-ethylhexyl trimellitate also known as tri(2-ethylhexyl) 1,2,4-benzene tricarboxylate or triisononyl trimellitate also known as trinonyl 1,2,4-benzenetricarboxylate.

In one or more embodiments, the non-organometallic aromatic triester compound can include a compound of formula (2):

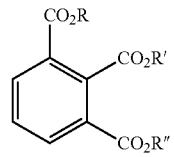

wherein R, R' and R" are independently selected from hydrocarbyl groups containing 1 to 20 carbons. Examples of compounds of formula (2) include trimethyl 1,2,3-benzenetricarboxylate, triethyl 1,2,3-benzenetricarboxylate, tripropyl 1,2,3-benzenetricarboxylate, tributyl 1,2,3-benzenetricarboxylate, tripentyl 1,2,3-benzenetricarboxylate, trihexyl 1,2,3-benzenetricarboxylate, triheptyl 1,2,3-benzenetricarboxylate, tricyclohexyl 1,2,3-benzenetricarboxylate, trioctyl 1,2,3-benzenetricarboxylate, tri(2-ethylhexyl) 1,2,3-benzene tricarboxylate, trinonyl 1,2,3-benzenetricarboxylate, tridecyl 1,2,3-benzenetricarboxylate, tridodecyl 1,2,3-benzenetricarboxylate, butyldimethyl 1,2,3-benzenetricarboxylate, and butyldiethyl 1,2,3-benzenetricarboxylate, Other examples of non-organometallic trimellitate ester coupling agents are tri-2-ethylhexyl hemimellitate also known as tri(2-ethylhexyl) 1,2,3-benzene tricarboxylate or triisononyl hemimellitate also known as trinonyl 1,2,3-benzenetricarboxylate.

In one or more embodiments, the non-organometallic aromatic triester compound can include a compound of formula (3):

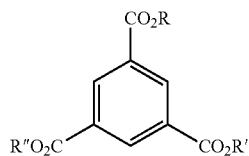

wherein R, R' and R" are independently selected from hydrocarbyl groups containing 1 to 20 carbons. Examples of compounds of formula (3) include trimethyl 1,3,5-benzenetricarboxylate, triethyl 1,3,5-benzenetricarboxylate, tripropyl 1,3,5-benzenetricarboxylate, tributyl 1,3,5-benzenetricarboxylate, tripentyl 1,3,5-benzenetricarboxylate, trihexyl 1,3 5-benzenetricarboxylate, triheptyl 1,3,5-benzenetricarboxylate, tricyclohexyl 1,3,5-benzenetricarboxylate, trioctyl 1,3,5-benzenetricarboxylate, tri(2-ethylhexyl) 1,3,5-benzene tricarboxylate, trinonyl 1,3,5-benzenetricarboxylate, tridecyl 1,3,5-benzenetricarboxylate, tridodecyl 1,3,5-benzenetricarboxylate, butyldimethyl 1,3,5-benzenetricarboxylate, and butyldiethyl 1,3,5-benzenetricarboxylate. Other examples of non-organometallic trimellitate ester coupling agents are tri-2-ethylhexyl trimesitate also known as tri(2-ethylhexyl) 1,3,5-benzene tricarboxylate or triisononyl trimesitate also known as trinonyl 1,3,5-benzenetricarboxylate.

In one or more embodiments, the coupling agent may be introduced to the polymerization mixture after a desired monomer conversion is achieved but before a quenching agent, for example, containing a protic hydrogen atom, is added. In one or more embodiments, the coupling agent is added to the polymerization mixture after a monomer conversion of at least 60%, in other embodiments at least 70%, in other embodiments at least 80%, in other embodiments at least 85%, and in other embodiments at least 90%. In these or other embodiments, the coupling agent is added to the polymerization mixture prior to a monomer conversion of 95%, in other embodiments prior to 90% monomer conversion, in other embodiments prior to 80% monomer conversion, in other embodiments prior to 70% monomer conversion, and in other embodiments prior to 60%. In one or more embodiments, the coupling agent is added after complete, or substantially complete monomer conversion.

In one or more embodiments, the coupling agent may be introduced to the polymerization mixture at a location (e.g., within a vessel) where the polymerization (or at least a portion thereof) has been conducted, for example, the primary polymerization vessel. In other embodiments, the coupling agent may be introduced to the polymerization mixture at a location that is distinct from where the bulk of the polymerization (or at least a portion thereof) has taken place. For example, the coupling agent may be introduced to the polymerization mixture in downstream vessels including downstream reactors or tanks, in-line reactors or mixers, extruders, or devolatilizers. In one or more embodiments, the conjugated diene monomer is polymerized in a primary agitated reaction vessel in the presence of a lanthanide-containing compound, an alkylating agent and optionally a halogen source to produce an intermediate polymer mixture, wherein the monomer conversion is 60% or more, 70% or more, 80% or more, 85% or more, 90% or more or 95% or more. A coupling agent can be added to the polymer mixture after achieving a desired monomer conversion rate. For example, the intermediate polymer having a desired monomer conversion rate (e.g., above 60%) can be transferred from the reaction vessel to a second reaction vessel for addition of the coupling agent to form a coupled polymer cement.

In one or more embodiments, the reaction between the coupling agent and the reactive polymer or intermediate polymer may take place within 30 minutes, in other embodiments within 5 minutes, and in other embodiments within one minute after the peak polymerization temperature is reached. In one or more embodiments, the reaction between the coupling agent and the reactive polymer can occur once the peak polymerization temperature is reached. In other embodiments, the reaction between the coupling agent and the reactive polymer can occur after the reactive polymer has been stored. In one or more embodiments, the storage of the intermediate polymer occurs at room temperature or below room temperature under an inert atmosphere. In one or more embodiments, the reaction between the coupling agent and the intermediate polymer may take place at a temperature from about 10° C. to about 150° C., and in other embodiments from about 20° C. to about 100° C. The time required for completing the reaction between the coupling agent and the intermediate polymer depends on various factors such as the type and amount of the catalyst system used to prepare the intermediate polymer, the type and amount of coupling agent, as well as the temperature at which the coupling reaction is conducted. in one or more embodiments, the reaction between the coupling agent and the intermediate polymer can be conducted for about 10 to 60 minutes.

Once a coupling agent has been introduced to the polymerization mixture and a desired reaction time has been provided, a quenching agent may be optionally added to the polymerization mixture or coupled polymer cement in order to deactivate any residual reactive polymer or monomer, catalyst, and/or catalyst components. In one or more embodiments, quenching agents include protic compounds, such as, but not limited to, alcohols, carboxylic acids inorganic acids, or a mixture thereof. In particular embodiments, the quenching agent includes a polyhydroxy compound as disclosed in co-pending U.S. Ser. No. 11/890,591, filed on Aug. 7, 2007, which is incorporated herein by reference.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Where cis-1,4-polydienes (e.g., cis-1.4-polybutadiene) are produced by one or more embodiments of the process of this invention, the cis-1,4-polydienes may advantageously have a cis-1,4 linkage content in excess of 96%, in other embodiments in excess of 97%, in other embodiments in excess of 98%, in other embodiments in excess of 98.5%, and in other embodiments in excess of 99%. The cis-1,4-polydienes produced by the process of the present invention exhibit excellent viscoelastic properties and are particularly useful in the manufacture of various tire components including, but not limited to, tire treads, sidewalls subtreads, and bead fillers. The cis-1,4-polydienes can be used as all or part of the elastomeric component of a tire stock, When the cis-1,4-polydienes are used in conjunction with other rubbers to form the elastomeric component of a tire stock, these other rubbers may be natural rubber, synthetic rubbers, and mixtures thereof.

The number average molecular weight ($M_n$) of these polymers may be from about 100,000 to about 350,000, in other embodiments from about 125,000 to about 300,000, in other embodiments from about 150,000 to about 275,000, and in other embodiments from about 175,000 to about 250,000, as determined by using gel permeation chromatography (GPC) calibrated with polystyrene standards and Mark-Houwink constants for the polymer in question. The molecular weight distribution or polydispersity ($M_w/M_n$) of these polymers may be from about 1.5 to about 5.0, and in other embodiments from about 2.0 to about 4.0.

Advantageously, the coupled polymers of this invention may exhibit improved cold-flow resistance. The coupled polymers are particularly useful in preparing rubber compositions that can be used to manufacture tire components. Rubber compounding techniques and the additives employed therein are generally disclosed in The Compounding and Vulcanization of Rubber, in Rubber Technology ($2^{nd}$ Ed. 1973). The rubber compositions prepared from the coupled polymers of this invention are particularly useful for forming tire components such as treads, subtreads, sidewalls, body ply skims, bead filler, and the like. Preferably, the coupled polymers of this invention are employed in tread and sidewall formulations.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as tillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

In the following examples, the Mooney viscosities ($ML_{1+4}$) of the polymer samples were determined at 100° C. by using a Mooney viscometer with a large rotor, a one-minute warm-up time, and a four-minute running time. The number average ($M_n$) and weight average ($M_w$) molecular weights and molecular weight distributions ($M_w/M_n$) of the polymer samples were determined by gel permeation chromatography (GPC) calibrated with standards and constants of the polymers in question. The cis-1,4-linkage contents of the polymer samples were determined by infrared spectroscopy.

Example 1

Synthesis of cis-1,4-polybutadiene

A first 76-liter nitrogen-purged reactor equipped with agitator blades was used as a polymerization reaction vessel. The following components were added to the reactor vessel as the catalyst system. The catalyst ingredients were passed through a static mixer and then added into the bottom of the reactor vessel. 33.38 kilograms per hour of hexane as a solvent (182.5 phm), 8.09 kilograms per hour of butadiene/hexane blend (21% w/w butadiene) (10 phm), 0.311 kilograms per hour of triisobutylaluminum (13.4% w/w) and diisobutyl aluminum (6.6% w/w) in hexane (0,34 phm), 0.114 kilograms per hour of neodymium versatate (4.4% w/w Nd basis) in hexane (0.0274 phm), and 0.051 kilograms per hour of ethyl aluminum dichloride (15% w/w) in hexane. 72.83 kilograms per hour of butadiene/hexane blend (21% w/w butadiene) (90 phm) was fed into the bottom of the reactor vessel in a separate inlet. The reactor vessel jacket temperature was set at about 95° C. and after about 25 minutes of mixing or residence time in the reactor, the resulting intermediate polymer was continuously transferred to a second 76-liter nitrogen-purged reaction vessel. Jacket temperature was adjusted to maintain the internal temperature of the first reaction vessel to support a monomer conversion of 80% or more. The Mooney viscosity ($ML_{1+4}$) of the intermediate polymer upon transferring to the second reaction vessel was measured to be 26.1.

A stream of 0.274 kilograms per hour of tri-2-ethylhexyl trimellitate (5% w/w) in hexane (0.075 phm) was fed into the side of the second reaction vessel in the continuous reactor system. The second reactor vessel jacket temperature was set at about 95° C. and after about 25 minutes of mixing or residence time in the reactor, the resulting coupled polymer cement was transferred to a collection vessel prepared with a hexane and isopropanol mixture for terminating the polymerization reaction. The Mooney viscosity ($ML_{1+4}$) of the coupled polymer cement upon transferring to the collection vessel was measured to be 38.9. Thus, coupling the intermediate polymer with tri-2-ethylhexyl trimellitate resulted in a viscosity increase of 49% or 12.8 units.

In the collection vessel the polymer was terminated with a level of about 0.5% w/w to the polymer. Subsequent to termination, antioxidant (Santoflex 77PD) was then added at a level of 0.04% w/w to the polymer and mixed for 2 hours. The finished polymer cement was then steam desolventized and dried of residual water down to a level of 0.75% w/w or below to achieve a polymer product with a Mooney viscosity ($ML_{1+4}$) of 42.6. Thus, coupling the intermediate polymer with tri-2-ethylhexyl trimellitate resulted in a polymer product with a viscosity increase of 63% or 16.5 units.

Example 2

Synthesis of cis-1,4-polybutadiene

The polymerization process of Example 1 was repeated with feeding different amounts of tri-2-ethylhexyl trimellitate (5% w/w) in hexane into the side of the second reaction vessel. Table 1 below shows the Mooney viscosity ($ML_{1+4}$) and relaxation (T80) that were measured for the intermediate polymer transferred to the second reaction vessel and the coupled polymer product.

For the relaxation (T80) measurement, it is taken at the end of the Mooney viscosity test. A force is applied to the polymer sample which results in an angular twisting of the sample. After a fixed period of time, this force is released and the rubber sample permitted to relax. The time that it takes for the rubber sample to relax back to 80 percent of its final Mooney viscosity value is measured (in seconds) and reported as T80. As the degree of branching of a rubber increases, its T80 increases. This is considered as being due to a branched cis 1,4-polybutadiene rubber which relaxes at a slower rate than a linear cis 1,4-polybutadiene rubber.

TABLE 1

| tri-2-ethylhexyl trimellitate (phm) | Intermediate Polymer Mooney Viscosity ($ML_{1+4}$) | Intermediate Polymer Relaxation (T80, sec) | Coupled Polymer Mooney Viscosity ($ML_{1+4}$) | Coupled Polymer Relaxation (T80, sec) | Increase in Mooney Viscosity ($ML_{1+4}$) | Increase in Relaxation (T80) |
|---|---|---|---|---|---|---|
| 0.01 | 25 | 1.8 | 33 | 2.1 | 8 (32%) | 0.4 (22%) |
| 0.025 | 24 | 1.8 | 42 | 2.6 | 18 (75%) | 0.8 (44%) |
| 0.05 | 25 | 1.7 | 39 | 2.3 | 14 (56%) | 0.6 (35%) |
| 0.075 | 26 | 1.9 | 43 | 2.8 | 17 (65%) | 0.9 (47%) |
| 0.132 | 28 | 2.3 | 38 | 2.7 | 11 (39%) | 0.4 (17%) |

Figure 2:
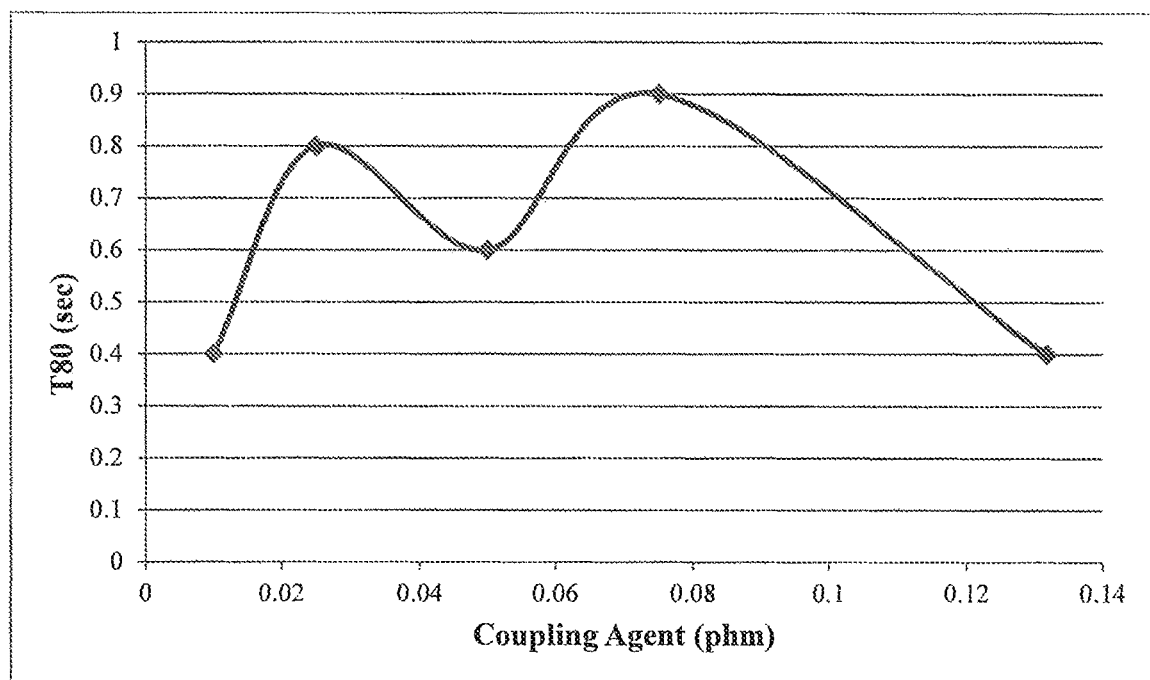
FIG. 2 is a graphical plot of polymer relaxation (T80) versus amount of coupling agent used for high-cis polybutadiene prepared according to one or more embodiments of the present invention.

FIGS. 1 and 2 graphically display the increase in viscosity and relaxation for the coupled polymers prepared in Example 2, respectively. As can be seen from Table 1, the use of tri-2-ethylhexyl trimellitate in a range of about 0.01 phm to about 0.013 phm can increase the Mooney viscosity of the intermediate polybutadiene polymer by 8 to 18 units or 32 to 75%. The use of the coupling agent in the range of about 0.025 phm to about 0.075 phm increased the Mooney viscosity of the intermediate polybutadiene polymer by 14 to 18 units or 56 to 75%. The relaxation time (T80) also significantly increases with the use of tri-2-ethylhexyl trimellitate. For example, the use of tri-2-ethylhexyl trimellitate in a range of about 0.01 phm to about 0.013 phm can increase the relaxation time (T80) of the intermediate polybutadiene polymer by 0.4 to 0.9 seconds or 17 to 47%. The use of the coupling agent in the range of about 0.025 phm to about 0.075 phm increased the relaxation time (T80) of the intermediate polymer by 0.6 to 0.9 seconds or 35 to 47%.

The number average ($M_n$) and weight average ($M_w$) molecular weights, molecular weight distributions ($M_w/M_n$) and the cis-1,4-linkage of the polymer samples of Table 1 were also measured. For 0.01 phm tri-2-ethylhexyl trimellitate, the $M_n$ was 199,333, the $M_w$ was 468,032, the $M_w/M_n$ was 2.35, and the cis-1,4-linkage was 96. For 0.025 phm tri-2-ethylhexyl trimellitate, the $M_n$ was 211,704, the $M_w$ was 536,908, the $M_w/M_n$ was 2.53, and the cis-1,4-linkage was 96.5. For 0.05 phm tri-2-ethylhexyl trimellitate, the $M_n$ was 189,086, the $M_w$ was 470,6570, the $M_w/M_n$ was 2.49, and the cis-1,4-linkage was 96.8. For 0.075 phm tri-2-ethylhexyl trimellitate, the $M_n$ was 206,941, the $M_w$ was 527,110, the $M_w/M_n$ was 2.55, and the cis-1,4-linkage was 96.4. For 0.132 phm tri-2-ethylhexyl trimellitate, the $M_n$ was 184,891, the $M_w$ was 540,540 and the $M_w/M_n$ was 2.92.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A process for preparing a polydiene, the process comprising the steps of:
   a. polymerizing conjugated diene monomer to a conversion of 60 percent or more within a liquid-phase polymerization mixture to form an intermediate polymer, the liquid-phase polymerization mixture comprising conjugated diene monomer, a lanthanide-containing compound and an alkylating agent, wherein the intermediate polymer comprises a base Mooney viscosity;
   b. adding a non-organometallic aromatic triester compound as a coupling agent in an amount of about 0.02 to about 0.12 phm to the intermediate polymer, wherein the addition of the non-organometallic trimellitate ester compound increases the base Mooney viscosity of the intermediate polymer in the range of about 30 to about 80 percent.

2. The process of claim 1, wherein the intermediate polymer of step (a) comprises a base cold flow value and the addition of the non-organometallic aromatic triester compound increases the base cold flow value of the intermediate polymer in the range of about 20 to about 50 percent.

3. The process of claim 1, wherein the lanthanide-containing compound is a neodymium compound.

4. The process of claim 1, wherein the non-organometallic aromatic triester compound is a compound of formula (1)

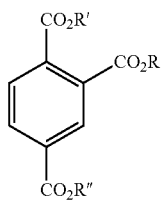

wherein R, R' and R" are independently selected from hydrocarbyl groups containing 1 to 20 carbons.

5. The process of claim 4, wherein the non-organometallic aromatic trimester compound is selected from the group consisting of trimethyl 1,2,4-benzenetricarboxylate, triethyl 1,2,4-benzenetricarboxylate, tripropyl 1,2,4-benzenetricarboxylate, tributyl 1,2,4-benzenetricarboxylate, tripentyl 1,2,4-benzenetricarboxylate, trihexyl 1,2,4-benzenetricarboxylate, triheptyl 1,2,4-benzenetricarboxylate, tricyclohexyl 1,2,4-benzenetricarboxylate, trioctyl 1,2,4-benzenetricarboxylate, tri(2-ethylhexyl) 1,2,4-benzenetricarboxylate, trinonyl 1,14-benzenetricarboxylate, tridecyl 1,2,4-benzenetricarboxylate, tridodecyl 1,2,4-benzenetricarboxylate, butyldimethyl 1,2,4-benzenetricarboxylate, butyldiethyl 1,2,4-benzenetricarboxylate, tri-2-ethylhexyl trimellitate and triisononyl trimellitate.

6. The process of claim 1, wherein the non-organometallic aromatic triester compound is a compound of formula (2)

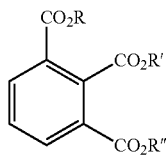

wherein R, R' and R" are independently selected from hydrocarbyl groups containing 1 to 20 carbons.

7. The process of claim 6, wherein the non-organometallic aromatic trimester compound is selected from the group consisting of trimethyl 1,2,3-benzenetricarboxylate, triethyl 1,2,3-benzenetricarboxylate, tripropyl 1,2,3-benzenetricarboxylate, tributyl 1,2,3-benzenetricarboxylate, tripentyl 1,2,3-benzenetricarboxylate, trihexyl 1,2,3-benzenetricarboxylate, triheptyl 1,2,3-benzenetricarboxylate, tricyclohexyl 1,2,3-benzenetricarboxylate, trioctyl 1,2,3-benzenetricarboxylate, tri(2-ethylhexyl) 1,2,3-benzenetricarboxylate, trinonyl 1,2,3-benzenetricarboxylate, tridecyl 1,2,3-benzenetricarboxylate, tridodecyl 1,2,3-benzenetricarboxylate, butyldimethyl 1,2,3-benzenetricarboxylate, butyldiethyl 1,2,3-benzenetricarboxylate, tri-2-ethylhexyl hemimellitate and triisononyl hemimellitate.

8. The process of claim 1, wherein the non-organometallic aromatic triester compound is a compound of formula (3)

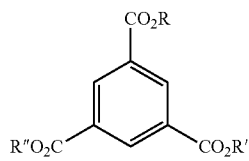

wherein R, R' and R" are independently selected from hydrocarbyl groups containing 1 to 20 carbons.

9. The process of claim 8, wherein the non-organometallic aromatic trimester compound is selected from the group consisting of trimethyl 1,3,5-benzenetricarboxylate, triethyl 1,3,5-benzenetricarboxylate, tripropyl 1,3,5-benzenetricarboxylate, tributyl 1,3,5-benzenetricarboxylate, tripentyl 1,3,5-benzenetricarboxylate, trihexyl 1,3,5-benzenetricarboxylate, triheptyl 1,3,5-benzenetricarboxylate, tricyclohexyl 1,3,5-benzenetricarboxylate, trioctyl 1,3,5-benzenetricarboxylate, tri(2-ethylhexyl) 1,3,5-benzenetricarboxylate, trinonyl 1,3,5-benzenetricarboxylate, tridecyl 1,3,5-benzenetricarboxylate, tridodecyl 1,3,5-benzenetricarboxylate, butyldimethyl 1,3,5-benzenetricarboxylate, butyldiethyl 1,3,5-benzenetricarboxylate, tri-2-ethylhexyl trimesitate and triisononyl trimesitate.

10. The process of claim 1, wherein the non-organometallic aromatic triester compound is added in an amount of about 0.035 to about 0.085 phm to the intermediate polymer and the amount of the lanthanide-containing compound is present in an amount from about 0.001 to about 2 mmol per 100 g of conjugated diene monomer.

11. A polydiene polymer prepared the process of claim 1, wherein the polythene polymer has a Mooney viscosity in the range about 35 to about 45 ($ML_{1+4}$).

12. A process for preparing a polybutadiene, the process comprising the steps of:
   a. polymerizing butadiene monomer in a reaction vessel in the presence of a lanthanide-containing compound and an alkylating agent to a conversion of 80 percent or more to form, an intermediate polymer;
   b. transferring the intermediate polymer to a second reaction vessel;
   c. adding a non-organometallic aromatic triester compound as a coupling agent in an amount of about 0.02 to about 0.12 phm to the polymer cement in the second reaction vessel to form a polybutadiene cement, wherein the polybutadiene cement comprises a Mooney viscosity in the range about 35 to about 45 ($ML_{1+4}$).

13. The process of claim 12, wherein the non-organometallic aromatic triester compound is a trimellitate ester compound selected from the group consisting of tri-2-ethylhexyl trimellitate or triisononyl trimellitate.

14. The process of claim 12, wherein the intermediate polymer transferred to the second reaction vessel comprises a Mooney viscosity in the range about 20 to about 30 ($ML_{1+4}$).

15. The process of claim 12, wherein the step a further comprises a halogen-containing compound in the reaction vessel.

16. The process of claim 1, wherein the non-organometallic aromatic triester compound is added prior to the conjugated diene monomer being polymerized to a conversion rate of 95 percent.

17. The process of claim 1, wherein the intermediate polymer of step (a) comprises a base relaxation time (T80) and the addition of the the non-organometallic aromatic treister compound increases the base relaxation time (T80) of the intermediate polymer in the range of about 20 to about 50 percent, the relaxation time (T80) is measured by applying force ot the intermediate polymer which results in an angular twisting of the intermediate polymer and releasing the applied force to let the intermediate polymer relax and measuring the time it taskes for the intermediate polymer to relax back to 80 percent of its final Mooney viscosity value.

18. A process for preparing a polydiene, the process comprising the steps of:
   a. polymerizing conjugated diene monomer to a conversion of 60 percent to 95 percent within a liquid-phase polymerization mixture to form an intermediate polymer, the liquid-phase of polymerization mixture comprising conjugated diene monomer, a lanthanide-containing compound and an alkylating agent, wherein the intermediate polymer comprises a base Mooney viscosity;
   b. adding a non-organometallic aromatic triester compound as a coupling agent in an amount of about 0.02 to about 0.12 phm to the intermediate polymer, the non-organometallic aromatic triester compound is a trimelliate ester compound, and wherein the addition of the trimelliate ester compound increases the base Mooney viscosity of the intermediate polymer in the range of about 30 to about 80 percent.

19. The process of claim 18, wherein the trimellitate ester compound is selected from the group consisting of tri-2-ethylhexyl trimelliate or triisononyl trimellitate.

20. The porocess of claim 19, wherein the trimellitate ester compound is added in an amount of about 0.035 to about 0.085 phm.

* * * * *